US010275437B2

(12) United States Patent
Brown et al.

(10) Patent No.: US 10,275,437 B2
(45) Date of Patent: *Apr. 30, 2019

(54) STRUCTURED DOCUMENT BOUNDING LANGUAGE

(71) Applicant: International Business Machines Corporation, Armonk, NY (US)

(72) Inventors: Jason M. Brown, Durham, NC (US); Malcolm H. M. Holloway, Durham, NC (US); Christopher J. Schaubach, Cary, NC (US); Richard S. Szulewski, Wake Forest, NC (US); Lisa M. Wood Bradley, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 301 days.

This patent is subject to a terminal disclaimer.

(21) Appl. No.: 15/232,377

(22) Filed: Aug. 9, 2016

(65) Prior Publication Data

US 2016/0350267 A1 Dec. 1, 2016

Related U.S. Application Data

(63) Continuation of application No. 12/102,285, filed on Apr. 14, 2008, now Pat. No. 9,542,375, which is a
(Continued)

(51) Int. Cl.
*G06F 17/00* (2006.01)
*G06F 17/24* (2006.01)
*G06F 17/22* (2006.01)

(52) U.S. Cl.
CPC .......... *G06F 17/24* (2013.01); *G06F 17/2247* (2013.01)

(58) Field of Classification Search
CPC .............................. G06F 17/2247; G06F 17/24
See application file for complete search history.

(56) References Cited

U.S. PATENT DOCUMENTS 5,966,123 A 10/1999 Kaplan
6,061,697 A * 5/2000 Nakao ................. G06F 17/2247
707/999.003
(Continued)

FOREIGN PATENT DOCUMENTS

WO WO 94/14122 6/1994

OTHER PUBLICATIONS

Connell, John, "Coding Techniques for Microsoft® Visual Basice.NET", Dec. 21, 2001, Microsoft Press. 6 pages.
(Continued)

*Primary Examiner* — William L Bashore
*Assistant Examiner* — David Faber
(74) *Attorney, Agent, or Firm* — Marcia L. Doubet

(57) ABSTRACT

Using a bounding language to control or restrict the changes that can be made to contents of a structured document (e.g., a document encoded in the Extensible Markup Language, or "XML"), and also includes the bounding language and documents encoded according to the bounding language. A Document Type Definition ("DTD") is defined as a "bounding DTD", and one or more structured documents containing editing restrictions are defined according to this DTD. A processing component uses a structured document containing editing restrictions as input, and programmatically determines which fields of another structured document can be edited, which fields should be hidden, and so forth. By restricting the parts of the file that can be edited, users who need to do the editing are shielded from irrelevant details, and can carry out their task with less risk of making errors
(Continued)

(and without needing to understand the details of the structured document markup language).

12 Claims, 12 Drawing Sheets

Related U.S. Application Data continuation of application No. 10/378,220, filed on Mar. 3, 2003.

(56) References Cited

U.S. PATENT DOCUMENTS

| | | | |
|---|---|---|---|
| 6,167,448 | A | 12/2000 | Hemphill et al. |
| 6,215,489 | B1 | 4/2001 | Kaplan |
| 6,404,445 | B1 | 6/2002 | Galea et al. |
| 6,585,778 | B1* | 7/2003 | Hind .................... G06F 17/2247 715/235 |
| 6,829,745 | B2 | 12/2004 | Yassin et al. |
| 6,941,510 | B1 | 9/2005 | Ozzie et al. |
| 7,107,282 | B1* | 9/2006 | Yalamanchi ........ G06F 17/2241 707/754 |
| 7,213,201 | B2 | 5/2007 | Brown et al. |
| 2001/0018696 | A1* | 8/2001 | Hori ...................... G06F 17/211 715/229 |
| 2001/0032218 | A1 | 10/2001 | Huang |
| 2002/0073399 | A1* | 6/2002 | Golden ............... G06F 17/2247 717/114 |
| 2002/0143818 | A1* | 10/2002 | Roberts ............... G06F 17/2205 715/234 |
| 2002/0184525 | A1 | 12/2002 | Cheng |
| 2003/0084078 | A1* | 5/2003 | Torii ................... G06F 17/2247 715/234 |
| 2003/0135825 | A1* | 7/2003 | Gertner ..................... G06F 8/38 715/230 |
| 2004/0003343 | A1* | 1/2004 | Liao ................... G06F 17/2247 715/242 |
| 2004/0098667 | A1* | 5/2004 | Atkinson ............ G06F 17/2205 715/239 |
| 2004/0143792 | A1* | 7/2004 | Demopoulos ....... G06F 17/2247 715/234 |
| 2004/0153967 | A1* | 8/2004 | Bender ............... G06F 17/2247 715/234 |
| 2004/0177315 | A1 | 9/2004 | Brown et al. |
| 2004/0177321 | A1 | 9/2004 | Brown et al. |
| 2004/0205644 | A1* | 10/2004 | Shaughnessy .......... G06F 17/24 715/255 |
| 2005/0165815 | A1* | 7/2005 | Ozzie .................. G06F 17/2205 |
| 2006/0026505 | A1 | 2/2006 | Mani et al. |
| 2008/0282144 | A1 | 11/2008 | Brown et al. |

OTHER PUBLICATIONS

Vedamuthu, Asir, "[Issues] Wsdl and INLINE Schema Definitions", Sep. 6, 2002. 5 pages.
Vazquez, Fabio, "Introducing XML for VFP Programmers—Part II", Mar. 1, 2002. 9 pages.
Jason M. Brown, et al., U.S. Appl. No. 10/378,220, filed Mar. 3, 2003, Office Action, dated Oct. 12, 2005, 8 pages.
Jason M. Brown, et al., U.S. Appl. No. 10/378,220, filed Mar. 3, 2003, Office Action, dated Feb. 1, 2006, 8 pages.
Jason M. Brown, et al., U.S. Appl. No. 10/378,220, filed Mar. 3, 2003, Advisory Action, dated Apr. 13, 2006, 3 pages.
Jason M. Brown, et al., U.S. Appl. No. 10/378,220, filed Mar. 3, 2003, Office Action, dated Jul. 17, 2006, 9 pages.
Jason Brown, et al., U.S. Appl. No. 10/378,220, filed Mar. 3, 2003, Examiner's Answer, dated Mar. 7, 2007, 14 pages.
Jason M. Brown, et al., U.S. Appl. No. 10/378,220, filed Mar. 3, 2003, BPAI Decision, dated Mar. 14, 2008, 17 pages.
Jason M. Brown, et al., U.S. Appl. No. 10/378,220, filed Mar. 3, 2003, Notice of Abandonment, dated May 27, 2008, 2 pages.
Jason M. Brown, et al., U.S. Appl. No. 10/378,214, filed Mar. 3, 2003, Office Action, dated Aug. 25, 2005, 7 pages.
Jason M. Brown, et al., U.S. Appl. No. 10/378,214, filed Mar. 3, 2003, Office Action, dated Feb. 6, 2006, 8 pages.
Jason M. Brown, et al., U.S. Appl. No. 10/378,214, filed Mar. 3, 2003, Advisory Action, dated Apr. 14, 2006, 3 pages.
Jason M. Brown, et al., U.S. Appl. No. 10/378,214, filed Mar. 3, 2003, Office Action, dated Jul. 14, 2006, 9 pages.
Jason M. Brown, et al., U.S. Appl. No. 10/378,214, filed Mar. 3, 2003, Notice of Allowance, dated Dec. 26, 2006, 4 pages.
Jason M. Brown, et al., U.S. Appl. No. 10/378,214, filed Mar. 3, 2003, Notice of Allowance, dated Jan. 26, 2007, 2 pages.
Jason M. Brown, et al., U.S. Appl. No. 12/102,285, filed Apr. 14, 2008, Office Action, dated Apr. 21, 2011, 13 pages.
Jason M. Brown, et al., U.S. Appl. No. 12/102,285, filed Apr. 14, 2008, Office Action, dated Oct. 17, 2011, 16 pages.
Jason M. Brown, et al., U.S. Appl. No. 12/102,285, filed Apr. 14, 2008, Office Action, dated Mar. 24, 2016, 14 pages.
Klarlund et al., "DSD: A schema langugae for XML", 2000, Proceedings of the third workshop on Formal methods in software practice FMSP '00, ACM Press, pp. 101-111.
Feng et al., "A semantic network-based design methodology for XML documents", Oct. 2002, ACM Transactions on Information Systems (TOIS), vol. 20 Issue 4, ACM Press, pp. 390-421.
"IBM Tivoli NetView for z/OS V5.1: Addressing the Challenges of End-to-End TCP/IP Management", Mar. 5, 2002, IBM United States Software Announcement 202-051, printed Jan. 29, 2003 <http://www2.ibmlink.ibm.com/>, 36 pages.
Sauer, Frank, "XMLTalk: A framework for automatic GUI rendering from XML specs", Java Report, Oct. 2001 (p. 16-23).
"Xeena", Jun. 13, 2000, AlphaWorks, IBM, printed Jul. 8, 2002, <http://www.alphaworks.ibm.com/tech/xeena> (p. 1-3).
Ball, Steve, "A Very Swish XML Editor", Zveno Pty. Ltd., printed Jul. 8, 2002, <http://www.zveno.com/papers/XMLAP2K/paper.html> (p. 1-11).
Piez, Wendell, "Re: DTD Files!", May 9, 2000, Biglist Inc., <http://www.biglist.com/lists/xsl-list/archives/200005/msg00353.html> (p. 1-2).
Klapsing, Reinhold et al., "An eXtensible Web Modeling Framework", University of Essen, Germany, Mar. 15, 1999 (p. 1-4).

* cited by examiner

```
405  <?xml version="1.0" encoding="UTF-8"?>
     <!DOCTYPE web-app PUBLIC "-//Sun Microsystems, Inc.//DTD Web Application 2.2//EN"
     "http://java.sun.com/j2ee/dtds/web-app_2_2.dtd">
        <web-app id="WebApp_1044374378543">
           <servlet id="Servlet_1044374367978">
412        <servlet-name>MibServiceServlet</servlet-name>
413        <display-name>Mib Service Servlet</display-name>
              <description>Services HTTPProxy Mib Service Requests for the Mib
410                          Browser.</description>
              <servlet-class>
                 com.tivoli.netview.snmp.modules.mibservice.servlet.MibServiceServlet
              </servlet-class>
           </servlet>
           <servlet id="Servlet_1044374367989">
              <servlet-name>SnmpServiceServlet</servlet-name>
              <display-name>Snmp Service Servlet</display-name>
              <description>Services HTTPProxy Snmp Service Requests for the Mib
420                          Browser.</description>
              <servlet-class>
                 com.tivoli.netview.snmp.modules.snmpservice.servlet.SnmpServiceServlet
              </servlet-class>
           </servlet>
           <servlet id="Servlet_1044374368018">
              <servlet-name>ZnvSecurity</servlet-name>
              <display-name>z/NetView Security Servlet</display-name>
430           <description>Handles security checking for the z/NetView web application.</description>
              <servlet-class>com.tivoli.nv390.webacc.security.ZNVSecurity</servlet-class>
              <load-on-startup>1</load-on-startup>
           </servlet>
```

FIG. 4
(cont'd)

```xml
<servlet id="Servlet_1044374369999">
   <servlet-name>cnm01_ZnvAccessServlet</servlet-name>
   <display-name>z/NetView Host Access Servlet (cnm01)</display-name>
   <description>This servlet services browser requests for z/NetView function, and should
                have the "cnm01" replaced with a z/NetView domain ID.</description>
   <servlet-class>com.tivoli.nv390.webacc.servlets.FLB_NvServ</servlet-class>
   <init-param>
      <param-name>HOST</param-name>
      <param-value>netviewhost.subnet.company.com</param-value>
      <description>Customize this value to be the fully qualified TCP hostname or IP address of
                   z/NetView.</description>
   </init-param>
   <init-param>
      <param-name>PORT</param-name>
      <param-value>8008</param-value>
      <description>Customize this value to be the IP port number on which the DSIWBTSK
                   task in z/NetView is listening.</description>
   </init-param>
</servlet>
</web-app>
```

<!ELEMENT bounds (non-editable?, hidden? ) >

<!ELEMENT non-editable ( servlet* ) >
<!ELEMENT hidden (servlet*) >

510 — <!ELEMENT servlet (
servlet-name-field?,display-name-field?,description-field?,class-jsp-field?,
load-on-startup-field?) >
<!ELEMENT servlet-name-field EMPTY>
<!ELEMENT display-name-field EMPTY>
<!ELEMENT description-field EMPTY>
<!ELEMENT class-jsp-field EMPTY>
<!ELEMENT load-on-startup-field EMPTY>

520 — <!ATTLIST servlet id ID #REQUIRED>

```xml
<?xml version='1.0' encoding='UTF-8'?>
605 <!DOCTYPE bounds SYSTEM 'webxml.dtd'>
<bounds>
    <non-editable>                            621
        <servlet id="Servlet_1044374367989">
            <servlet-name-field/> 622
            <load-on-startup-field/> 623
        </servlet>
        <servlet id="Servlet_1044374367978">
            <servlet-name-field/>
            <load-on-startup-field/>
        </servlet>
    </non-editable>
    <hidden>                          651
        <servlet id="Servlet_1044374368018">
            <servlet-name-field/>
            <display-name-field/>
            <description-field/>
            <servlet-class-field/>
            <load-on-startup-field/>
        </servlet>
    </hidden>
</bounds>
```

```
<!
(C) Copyright IBM Corporation 2002. All rights reserved.
>

<!
Bounds is the root element. This dtd is tailored for writing an XML file that can
bound customer function in an application.
>
```
810 `<!ELEMENT bounds ( global?,non-editable?, hidden?,action-required? ) >`

```
<!
Global elements are used to disable global function such as the ability to delete
or add a particular element
>
<!ELEMENT global ( disable-add-new-servlet?,disable-add-new-init-param? ) >
<!
Do not allow new servlets to be added
>
```
820 `<!ELEMENT disable-add-new-servlet EMPTY>`

```
<!
Do not allow new init params to be added for servlets with servlet name
or all servlets if left blank
>
<!ELEMENT disable-add-new-init-param (servlet-name*)>
<!
Specify which fields of which elements can be edited. For each element there is an "all"
version which makes a field noneditable for every instance of the element and a verion
that can be tailored for a specific element with a specified name
>
```

830
```
<!ELEMENT non-editable ( non-editable-all-servlet?,non-editable-servlet*,
non-editable-all-init-param?,non-editable-init-param* ) >
<!ELEMENT non-editable-servlet (servlet-name,
servlet-name-field?,display-name-field?,description-field?,class-jsp-field?,
servlet-mapping-field?,load-on-startup-field?) >
<! makes no difference which servlet you are >
<!ELEMENT non-editable-all-servlet ( servlet-name-field?,display-name-field?,
description-field?,class-jsp-field?,servlet-mapping-field?,load-on-startup-field?) >
<!ELEMENT servlet-name (#PCDATA) >
<!ELEMENT servlet-name-field EMPTY>
<!ELEMENT display-name-field EMPTY>
<!ELEMENT description-field EMPTY>
<!ELEMENT class-jsp-field EMPTY>
```

FIG. 8 (cont'd)

830
```
<!ELEMENT servlet-mapping-field EMPTY>
<!ELEMENT load-on-startup-field EMPTY>

<!ELEMENT non-editable-init-param (param-name,servlet-name*,param-name-field?,
param-value-field?,description-field?)>
<!
makes no difference which initParam you are
>
<!ELEMENT non-editable-all-init-param (param-name-field?,param-value-field?,
description-field?)>
<!ELEMENT param-name (#PCDATA) >
<!ELEMENT param-name-field EMPTY>
<!ELEMENT param-value-field EMPTY>
```

840
```
<!
Hide an entire element
>
<!ELEMENT hidden ( hidden-servlet*,hidden-init-param* ) >
<!
Hide servlet based on servlet name
>
<!ELEMENT hidden-servlet ( servlet-name ) >
<!
Servlet name is optional. If there is no servlet name object, then assume that every
init param with param name is hidden. If there is a servlet name or names,
only hide the init params with param name in the those servlets
>
<!ELEMENT hidden-init-param (param-name,servlet-name*) >
```

850
```
<!
Used to specify that a field of an element should be changed by the customer
>
<!ELEMENT action-required ( action-required-servlet*,action-required-init-param* ) >
<!ELEMENT action-required-servlet (servlet-name,
servlet-name-field?,display-name-field?,
description-field?,class-jsp-field?,servlet-mapping-field?,load-on-startup-field?) >
<!ELEMENT action-required-init-param (param-name,servlet-name*,param-name-field?,
param-value-field?,description-field?)>
```

```
<?xml version='1.0' encoding='UTF 8'?>
<!DOCTYPE bounds SYSTEM 'webxml.dtd'>
<!
(C) Copyright IBM Corporation 2002. All rights reserved.
>
<bounds>
```

*910*
```
<global>
    <disable-add-new-servlet />
    <disable-add-new-init-param />
</global>
```

```
<non-editable>
```

*920*
```
<non-editable-all-servlet>
    <load-on-startup-field/>
</non-editable-all-servlet>
```

*930*
```
<non-editable-servlet>
    <servlet-name>
        SnmpServiceServlet
    </servlet-name>
    <servlet-name-field/>
    <class-jsp-field/>
    <servlet-mapping-field/>
</non-editable-servlet>
```

*940*
```
<non-editable-all-init-param>
    <param-name-field/>
</non-editable-all-init-param>
```

```
</non-editable>
```

FIG. 9 (cont'd)

```
<hidden>
    <hidden-servlet>
        <servlet-name>
            ZnvSecurity
        </servlet-name>
    </hidden-servlet>                        950

<hidden-init-param>
        <param-name>
            ZNV_INSTALLATION
        </param-name>                        960

</hidden-init-param>

</hidden>

<action-required>
        <action-required-servlet>
            <servlet-name>
                cnm01_ZnvAccessServlet
            </servlet-name>                  970
            <servlet-name-field/>
            <servlet-mapping-field/>
        </action-required-servlet>

<action-required-init-param>
            <param-name>
                HOST
            </param-name>
            <servlet-name>                   980
                cnm01_ZnvAccessServlet
            </servlet-name>
            <param-value-field/>
        </action-required-init-param>
    </action-required>

</bounds>
```

STRUCTURED DOCUMENT BOUNDING LANGUAGE

RELATED INVENTION

The present invention is related to commonly-assigned U.S. Pat. No. 7,213,201 (Ser. No. 10/378,214), titled "Meta Editor for Structured Documents", which was filed on Mar. 3, 2003 and is hereby incorporated herein by reference.

BACKGROUND OF THE INVENTION

Field of the Invention

The present invention relates to computer software, and deals more particularly with methods, systems, computer program products, and methods of doing business by using a bounding language to control or restrict the changes that can be made to contents of a structured document (e.g., a document encoded in the Extensible Markup Language, or "XML"), and also includes the bounding language and documents encoded according to the bounding language.

RESERVATION OF COPYRIGHT

A portion of the disclosure of this patent document contains material to which a claim of copyright protection is made. The copyright owner has no objection to the facsimile reproduction by anyone of the patent document or the patent disclosure, as it appears in the Patent and Trademark Office patent file or records, but reserves all other rights whatsoever.

DESCRIPTION OF THE RELATED ART

XML is a derivative of the Standard Generalized Markup Language, or "SGML", and is considered the primary publishing language of the Web. XML is a simplified version of SGML, tailored to structured Web document content. XML is an "extensible" markup language in that it provides users the capability to define their own tags. This makes XML a very powerful language that enables users to easily define a data model, which may change from one document to another. When an application generates the XML markup tags (and corresponding data) for a document according to a particular XML data model and transmits that document to another application that also understands this data model, the XML notation functions as a conduit, enabling a smooth transfer of information from one application to the other. By parsing the tags of the data model from the received document, the receiving application can re-create the information for display, printing, or other processing, as the generating application intended it.

A Document Type Definition ("DTD") defines the structure of a document encoded in SGML, or in its derivatives such as XML. (For ease of reference, subsequent discussions herein refer to the XML notation in particular. However, this is for purposes of illustration and not of limitation. The discussions herein may be applied also to other structured markup languages that use DTDs or similar mechanisms for validation.) An XML parser processes an XML DTD along with a document encoded in XML to validate the document (e.g., to ensure that the document adheres to the data model defined by the DTD).

Because of its power and flexibility, XML is used in many diverse ways. While the term "document" is used herein when discussing encodings of XML, it is to be understood that the information represented using XML may comprise any type of information, and is not limited to the traditional interpretation of the word "document". For example, XML may be used to represent the layout of records in a data repository, the layout of a user interface for an application program, or the data to be used with a program or to be used as the values of records in a repository. For ease of reference, the term "document" (or simply "XML file") will be used herein to refer to these diverse types of information.

One of the many ways in which XML may be used is to specify configuration parameters and configuration data to be used by an executing application. In such scenarios, it may be necessary for a human user (such as a systems administrator) to edit an XML document, for example to customize the document for a particular installation. This customization might include providing information for initially setting up the proper execution environment, or specifying information pertaining to the setting of user preferences or other enterprise-specific customization, and so forth. For example, to set up the execution environment, it might be necessary to provide various path names and/or file names at one or more locations within an XML document that has been provided for use with an application. As an example of setting user preferences by editing an XML document, the document might contain syntax for setting the background or text color of graphical user interface ("GUI") panels; the user might then edit the XML document to specify a particular color. An enterprise-specific customization might include editing an XML document to specify the name and/or location of a graphic image (such as a company logo) that this enterprise wishes to display on its GUI panels.

Many more examples of customizing an XML document by editing its contents may be imagined. Furthermore, there may be other motivations for editing XML documents and for restricting the edits (e.g., due to security concerns), and the references herein to customization should therefore be viewed as illustrative but not as limiting the present invention.

Often, the file that a user is asked to edit contains many more XML tags (and much more data) than he needs to be exposed to. For example, the XML file that a user must edit may be defined by an industry standard DTD that might have dozens of tags and tag attributes. In such a case, the user may only need to edit a very small portion of the file, but is exposed to many details that don't concern him. Sometimes, the user can put the application in an unstable state by editing the XML file incorrectly.

There are several ways that are currently available for someone to edit XML. Three of the most common are: (1) using any ASCII text editor; (2) using one of the many GUI editors that support XML markup tags; (3) or using a customized GUI program provided especially for editing a particular XML file (or files).

Using an ASCII editor gives the average user no benefit: if the user is not experienced with XML, he is very likely to be confused or make mistakes. Accidentally deleting a character from the tag syntax, for example, will make the file invalid, and the inexperienced user may have difficulty in correcting simple problems of this type.

There are several GUI editors on the market that support XML markup tags, but these generally do not provide users with much more benefit than the ASCII editors. That is, the user is still required to understand XML in order to avoid making mistakes—although the GUI editor may make it easier to locate and correct simple mistakes, through its knowledge of valid XML syntax.

In both the ASCII and GUI XML editor scenarios, the fact remains that the user is exposed to the entire file being edited, even though he may only be concerned with a fraction of the data. This may add significantly to the user's confusion and the possibility for making mistakes. Furthermore, there may be parts of the data that the user should not be changing, and the ASCII and GUI XML editor scenarios are not able to provide "selective" file editing capability.

A customized GUI program provided especially for editing a particular XML file is the best way for a user to edit XML; however, it can be extremely expensive for an application development team to provide such a customized program that will meet the needs of a diverse set of users.

Accordingly, what is needed is a cost-effective way to enable users to edit XML files (or files encoded in other markup languages), while shielding them from details of the XML language (e.g., the tags and attributes of a particular data model) and at the same time, enabling application developers to have some control over what the users can do when they are editing XML files.

SUMMARY OF THE INVENTION

An object of the present invention is to provide cost-effective techniques to enable users to edit structured document files, such as XML files.

Another object of the present invention is to provide these techniques in a manner that shields users from details of the markup language used for encoding the structured document file.

Yet another object of the present invention is to provide techniques that enable application developers to have some control over what users can do when editing a structured document file.

A further object of the present invention is to provide techniques for using a bounding language to restrict the changes that can be made to contents of a structured document.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides software-implemented methods, systems, and computer program products for controlling manipulation of contents of a structured document. In preferred embodiments, this technique comprises: processing a bounding file to determine restrictions on how a structured document can be manipulated, wherein the bounding file adheres to a bounding language that is defined according to a second structured markup language definition document that specifies allowable restrictions on how contents of the structured document can be manipulated, wherein the structured document is defined according to a first structured markup language definition document; and enforcing the determined restrictions on how the structured document can be manipulated.

Typically, the first structured markup language definition document and the second structured markup language definition document are DTD documents, and the structured document is encoded in XML.

The bounding file may specify (for example) one or more elements of the structured document that can be edited and/or one or more elements that should be hidden from editing. It may alternatively or additionally specify (for example) one or more parameters of one or more elements of the structured document that can be edited and/or one or more parameters of one or more elements of the structured document that should be hidden from editing.

Enforcing the restrictions preferably further comprises editing, by a user, the structured document; and automatically constraining the editing according to the determined restrictions.

In another embodiment, the present invention provides one or more bounding documents encoded in a structured markup language, wherein a particular bounding document may be stored on one or more computer-readable media and comprises one or more restrictions on how a structured document can be edited. The one or more restrictions are encoded in the structured markup language, and adhere to a bounding language that is defined according to a bounding language definition document (e.g., a bounding DTD) that specifies allowable restrictions on how contents of the structured document can be manipulated, and the structured document is defined according to a structured markup language definition document (e.g., an XML DTD). The one or more restrictions preferably refer to markup language elements defined in the structured markup language definition document.

The disclosed techniques may also be used advantageously in methods of doing business, whereby a service is offered to clients for (1) providing one or more XML, bounding files to control changes to be made when users edit selected files and/or (2) deploying an editing capability that enforces such controls. This service may be provided under various revenue models, such as pay-per-use billing, monthly or other periodic billing, and so forth, and may offer clients advantages of improved accuracy for XML file editing and reduced debugging time caused by inaccurate editing.

The present invention will now be described with reference to the following drawings, in which like reference numbers denote the same element throughout.

BRIEF DESCRIPTION OF THE DRAWINGS

FIG. 4 shows a sample XML file that users might need to edit, where the editing can be advantageously controlled using techniques disclosed herein;

FIG. 5 shows a "bounding DTD" that defines allowable syntax for specifying "bounds" on how files such as the sample XML file in FIG. 4 can be edited;

FIG. 6 depicts a sample "XML bounding file" that adheres to the bounding DTD in FIG. 5, and which specifies a particular set of restrictions or bounds on editing a file such as the sample XML file in FIG. 4;

FIG. 8 provides an alternative bounding DTD, which may be used in alternative embodiments to provide different degrees of control when specifying bounds on how files such as the sample XML file in FIG. 4 can be edited; and FIG. 9 illustrates a sample XML bounding file created according to the alternative bounding DTD in FIG. 8.

DESCRIPTION OF PREFERRED EMBODIMENTS

Figure 1:
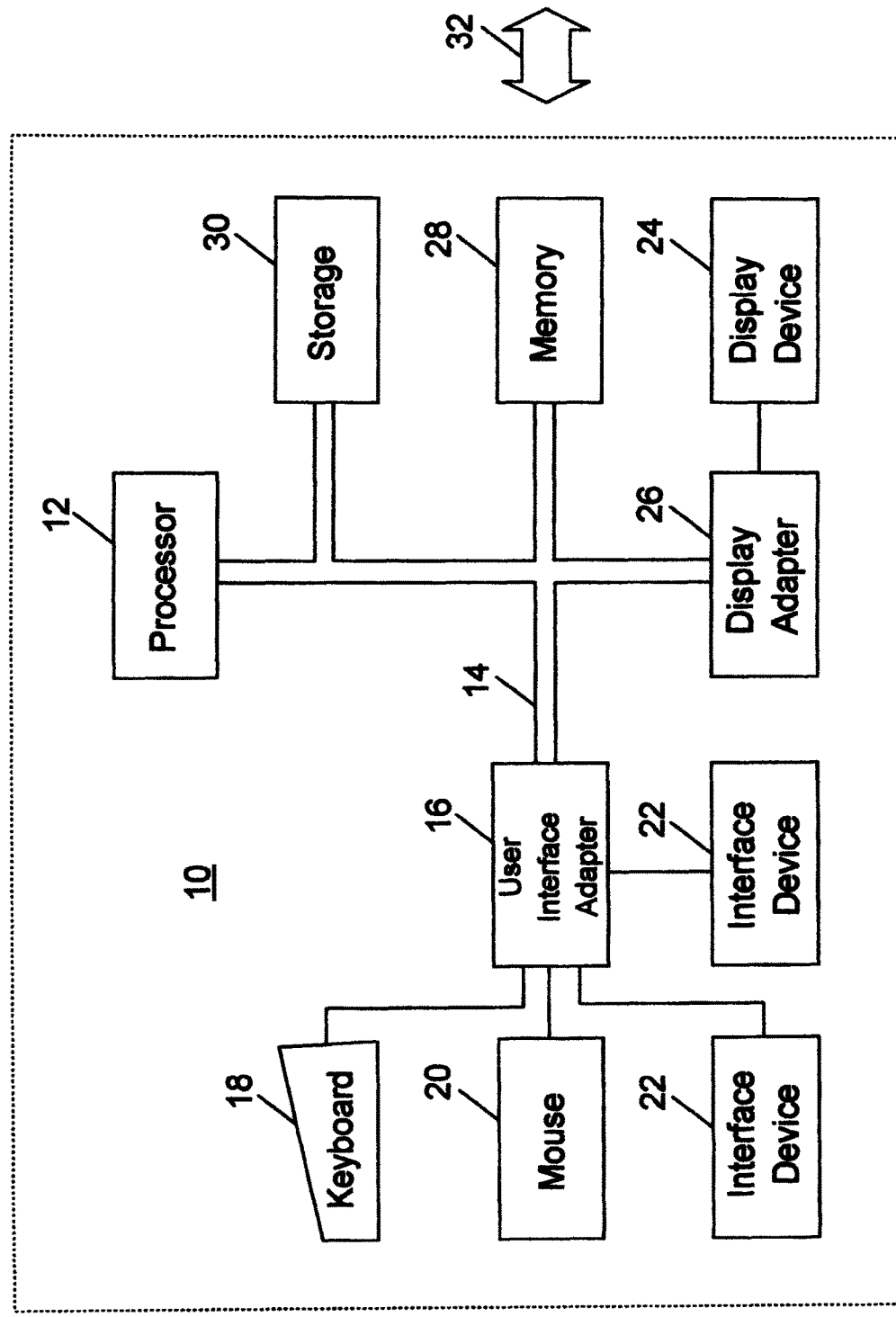
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a cellular digital packet data ("CDPD") card. The workstation 10 may be associated with such other computers in a local area network ("LAN") or a wide area network ("WAN"), or the workstation 10 can be a client in a client/server arrangement with another computer, etc. All of these configurations, as well as the appropriate communications hardware and software, are known in the art.

Figure 2:
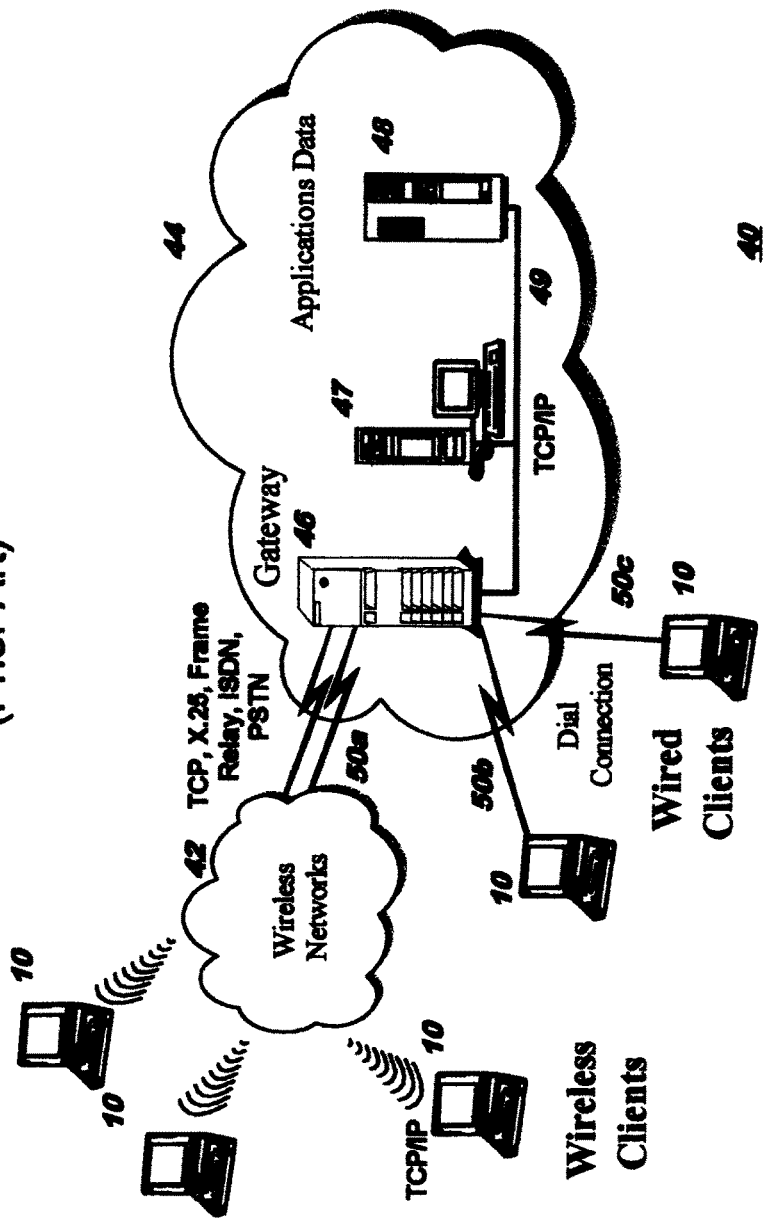
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48, which is illustrated in FIG. 2 as storing applications data). A gateway computer 46 serves as a point of entry into each network 44. The gateway 46 may be preferably coupled to another network 42 by means of a communications link 50a. The gateway 46 may also be directly coupled to one or more workstations 10 using a communications link 50b, 50c. The gateway computer 46 may be implemented utilizing an Enterprise Systems Architecture/370™ available from the International Business Machines Corporation ("IBM®"), an Enterprise Systems Architecture/390® computer, etc. Depending on the application, a midrange computer, such as an Application System/400® (also known as an AS/400®) may be employed. ("Enterprise Systems Architecture/370" is a trademark of IBM; "IBM", "Enterprise Systems Architecture/390", "Application System/400", and "AS/400" are registered trademarks of IBM.)

The gateway computer 46 may also be coupled by connection 49 to a storage device (such as data repository 48). Further, the gateway 46 may be directly or indirectly coupled to one or more workstations 10.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations 10 may be located in Florida. The workstations 10 may connect to the wireless network 42 using a networking protocol such as the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50a such as TCP or User Datagram Protocol ("UDP") over IP, X.25, Frame Relay, Integrated Services Digital Network ("ISDN"), Public Switched Telephone Network ("PSTN"), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 2.

Software programming code which embodies the present invention is typically accessed by the microprocessor 12 of the workstation 10 or server 47 from long-term computer-readable storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed from the memory or storage of one computer system over a network of some type to other computer systems for use by such other systems (and their users). Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

The computing environment in which the present invention may be used includes an Internet environment, an intranet environment, an extranet environment, or any other type of networking environment. These environments may be structured in various ways, including a client-server architecture or a multi-tiered architecture. The present invention may also be used in a disconnected (i.e. stand-alone) mode, for example where a user edits an XML file on a workstation, server, or other computing device without communicating across a computing network.

When used in a networking environment, a user of the present invention may connect his computer to a server using a wireline connection or a wireless connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The user's computer may be any type of computer processor, including laptop, handheld, or mobile computers; vehicle-mounted devices; desktop computers; mainframe computers; personal digital assistants ("PDAs"); Web-enabled cellular phones; Web appliances; wearable computing devices; so-called "smart" appliances in the home; etc., having processing (and optionally communication) capabilities. The remote server, similarly, can be one of any number of different types of computer which have processing and communication capabilities. These techniques are well known in the art, and the hardware devices and software which enable their use are readily available. Hereinafter, the user's computer will be referred to equivalently as a "workstation", "device", or "computer", and use of any of these terms or the term "server" refers to any of the types of computing devices described above.

In the preferred embodiment, the present invention is implemented as one or more computer software programs. The software may operate on a server in a network, as one or more modules (also referred to as code subroutines, or "objects" in object-oriented programming) which are invoked upon request. Alternatively, the software may operate on a user's workstation. The server may be functioning as a Web server, where that Web server provides services in response to requests from a client connected through the Internet. Alternatively, the server may be in a corporate intranet or extranet of which the client's workstation is a component, or in any other networking environment.

The present invention enables application developers to use their domain-specific or application-specific knowledge to bound user actions when users are editing XML files. A bounding DTD is defined, and one or more bounding files may be created according to this bounding DTD, where each bounding file specifies a particular set of restrictions on editing an XML, file. A bounding DTD correlates to the DTD for an XML file that requires customization (i.e., editing). This bounding DTD contains elements that describe actions to take against defined elements of an XML file created according to the other DTD. These actions can include, but need not be limited to, "hide the element" (either hide the entire element or hide specified child elements); "make the element non-editable" (either the entire element is non-editable or specified child elements are non-editable); etc.

For example, a bounding file might specify that certain tags (including their data and the data of their child tags) are never editable, while another bounding file might specify that tags are non-editable only under certain conditions (such as the tag's attributes having particular values). The bounding files are also encoded in XML, in preferred embodiments, and are referred to equivalently herein as "XML bounding files". (The term "XML element" is used herein to refer to an XML tag and its data.)

After the bounding DTD is completed, an XML bounding file can be written (for example, by a product development team) under the restrictions of the bounding DTD. A processing component (which, in preferred embodiments, operates within an editing component) then reads in this XML bounding file and, based on its specified restrictions, provides a set of editing actions that limit the user in what he can see and do with an XML element. This XML bounding file can then be changed, if desired, so that the processing component acts differently, depending on the revised restrictions in the XML bounding file. Thus, editing operations available in the same processing component (and on the same input XML file for which editing is to be bounded) can be tailored to different users with diverse needs or different tasks as long as there is a different implementation of the XML bounding file.

As stated earlier, the techniques disclosed herein enable controlling how users edit structured documents. Preferred embodiments will be described with reference to editing files that contain information for setting up an application execution environment. However, it should be apparent that editing files (and restricting edits) for other motivations and editing other types of files are also within the scope of the present invention.

Note that the word "file" is used in this disclosure to refer to stored data. This is for ease of reference only, and is not meant to imply any particular structure for storing the data, such as conventional "flat files". The data with which the present invention may be beneficially used may be stored in any number of ways without deviating from the inventive concepts disclosed herein, such as: a data element in a database, an object attribute in a directory entry, an object in flash memory, etc.

Techniques are known in the art with which GUI editors allow XML, files created according to a DTD to be edited (and validated). The Xeena editor, for example, parses a DTD to learn the syntax of documents adhering to that DTD, and then builds this knowledge into a visual, tree-directed editing paradigm where users are not allowed to define invalid XML files. Thus, if the DTD specifies allowable tags as <A>, <B>, and <C>, the user is not allowed to create a file with a tag <D>. The present invention, on the other hand, provides much finer-grained control over the editing process, using one DTD that correlates to another DTD, as will be described.

Preferred embodiments of the present invention will now be discussed in more detail with reference to FIGS. 3-9.

Figure 3:
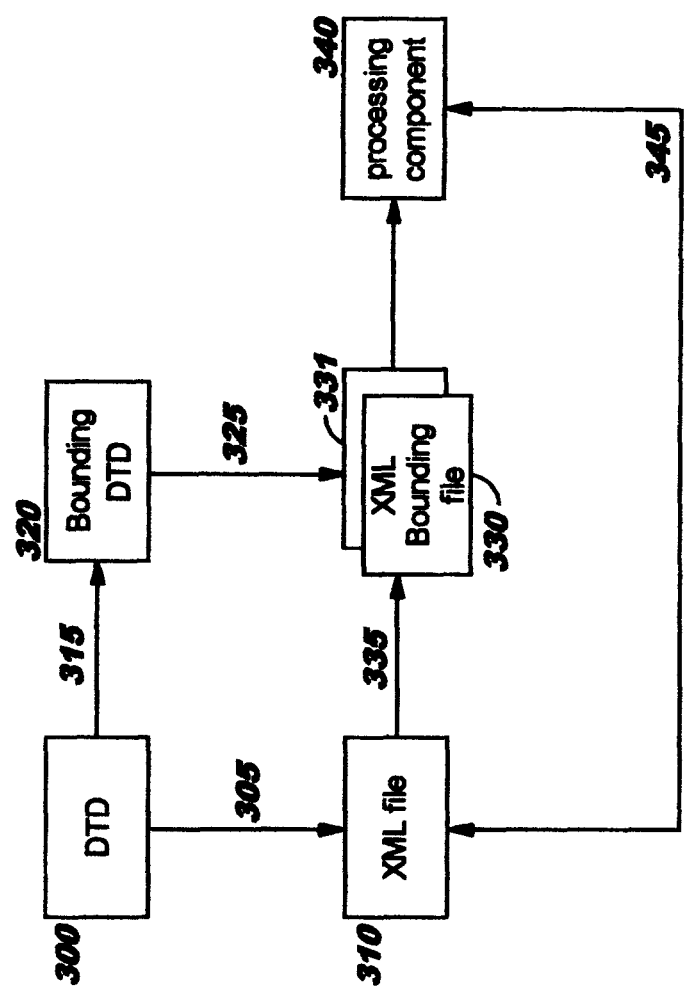
FIG. 3 illustrates, at a high level, components used in preferred embodiments of the present invention.

FIG. 3 illustrates components used in preferred embodiments. A first DTD 300 and a first XML document 310 are provided, where XML document/file 310 adheres to the syntax requirements specified in DTD 300. As is known in the art, a DTD defines allowable syntax, and documents may then be written that adhere or conform to this syntax or language. Arrow 305 is intended to show this relationship between DTD 300 and XML document 310. Assume for purposes of discussion that XML document 310 is quite large, having perhaps hundreds of elements (some of which may obviously use the same tags). Problems encountered in the prior art when users are expected to edit a file of this type without compromising its syntactic and semantic integrity have been described above.

The present invention defines a bounding DTD 320. This bounding DTD is directed toward limiting the changes that can be made to XML document 310. Arrow 315 therefore denotes a relationship between DTD 300 and bounding DTD 320. The bounding DTD defines the allowable syntax for an XML bounding file. Arrow 325 shows this relationship between a bounding DTD and its XML bounding file(s). Just as more than one XML file may be created that adheres to the syntax requirements specified in DTD 300, more than one XML bounding file may be created according to the bounding DTD. FIG. 3 illustrates a first XML bounding file 330 and second XML bounding file 331. (Note that embodiments of the present invention need not include, or process, more than one XML bounding file for bounding a particular XML file; two XML bounding files 330, 331 are shown in FIG. 3 for purposes of illustration.)

A bounding file may be considered as embodying a set of rules, where these rules conform to the bounding DTD and specify how a document instance (such as XML document 310) created according to a different DTD (such as DTD 300) can be edited. Arrow 335 indicates that XML bounding files 330, 331 are related to XML document 310 in this manner.

A particular XML bounding file 330 is input to a processing component 340, according to the present invention. The processing component 340 processes the XML bounding file to control the editing of another XML file 310. Processing component 340 therefore has a relationship, indicated by arrow 345, to the XML file 310 (or, more precisely, to a revised version of XML file 310 that is created by the user as he uses processing component 340 for editing; thus arrow 345 indicates that the XML document 310 may be an input as well as an output of processing component 340). The bounding DTD may also be used as an input to processing component 340, for example to validate the syntax of the XML bounding file.

So, for example, if XML document 310 does in fact have hundreds of elements, using dozens of different tags, there may be scenarios in which the users should only be allowed to change some very small number of these elements. These restrictions are specified, according to the present invention, in an XML bounding file 330. Processing component 340 will therefore only allow the user to access this very small number of identified elements.

A more detailed example of files used by an embodiment of the present invention will be described with reference to the sample files in FIGS. 4-6. FIG. 4 is a simple example of an XML file to be edited. This particular example file adheres to the de facto standard DTD defined by Sun Microsystems, Inc., for Web applications. This DTD has not been reproduced herein, because it is to be used under license for servlet deployment, but its contents may be viewed on the Internet at the location shown by reference number 405. (The particular contents of this DTD are not material to an understanding of the present invention. Sample file 400 represents an accurate subset of the language defined therein.)

In the sample XML file 400, 4 servlet elements 410, 420, 430, 440 are defined. By referring to the description (sub) elements (i.e., the values of the <description> tags), it can be seen that these servlets are for HTTPProxy Mib service requests, HTTPProxy SNMP service requests, security checking, and servicing browser requests for z/NetView function, respectively. Further details of these servlet elements will be discussed with reference to FIGS. 5 and 6. (The syntax in FIG. 4 has been extracted from a file named "web.xml" that ships with IBM's Tivoli® NetView® for z/OS™ product, where this file is used for establishing the environment thereof. For the sake of brevity, only representative syntax elements have been included herein, and therefore this sample file 400 is not intended to provide complete details for environment establishment. "Tivoli" and "NetView" are registered trademarks, and "z/OS" is a trademark, of IBM.)

A bounding DTD 500 is shown in FIG. 5. This bounding DTD specifies allowable syntax for creating a sample XML bounding file such as bounding file 600 in FIG. 6. The syntax of DTD 500 will be readily understandable to one of ordinary skill in the art. In particular, this DTD defines a language that has a "bounds" element as the root, where this bounds element optionally has a "non-editable" child element and a "hidden" child element. Each of these child elements may contain one or more "servlet" child elements. A servlet element optionally has a "servlet-name-field", "display-name-field", "description-field", "class-jsp-field", and a "load-on-startup-field" element, according to the syntax at 510. In this example, no tags have attributes except for the servlet tag, which requires an "id" attribute, as shown at 520.

According to techniques disclosed herein, an XML bounding language (such as that represented in DTD 500 of FIG. 5) can help developers easily control how users are allowed to manipulate XML data, in a very cost-effective manner. The developers simply prepare an XML bounding file (such as that represented at 600 in FIG. 6) that sets out rules, according to the bounding DTD syntax, for the data editing. A processing component then enforces these rules (as will be described in more detail with reference to FIG. 7). If the developers decide, at some point, that it would be desirable to control the manipulations in some other manner, or perhaps that they would like a different set of controls for a different user audience (for example, an audience that needs to perform different tasks with the XML file being bounded), the developers merely prepare a different XML bounding file and use this as input to the processing component. The editing restrictions can therefore be changed by the developers in an easily-modifiable way, and the editing restrictions can be adapted for use by diverse sets of users, each of which have slightly different needs, all without requiring re-compiling code.

Referring now to FIG. 6, this XML bounding file 600 includes a reference 605 to the bounding DTD in FIG. 5, a <non-editable> element 610, and a <hidden> element 640. Two servlets are identified as having fields that are non-editable, using <servlet> elements 620, 630, and another is specified as having fields that are hidden using <servlet> element 650. In particular, the element 620 and its tags 622, 623 specify that, if a servlet having an identifier matching the ID attribute value specified at 621 is located in the XML file to be bounded, then the processing component is to prevent the user from editing the <servlet-name> field and the <load-on-startup> fields in this servlet. The restrictions on the servlet identified in element 630 are identical. Note that the tags 622, 623 have been selected by the developer, in view of his knowledge of the contents of XML file 400 of FIG. 4, from the possible choices identified at 510 in the bounding DTD. In the case of the <hidden> element 640, tags for all five of the allowable child elements have been specified, and thus when a servlet having the identifier at 651 appears in the XML file 400, the processing component will ensure that all five of its fields will be hidden from the user during the editing process.

Figure 7:
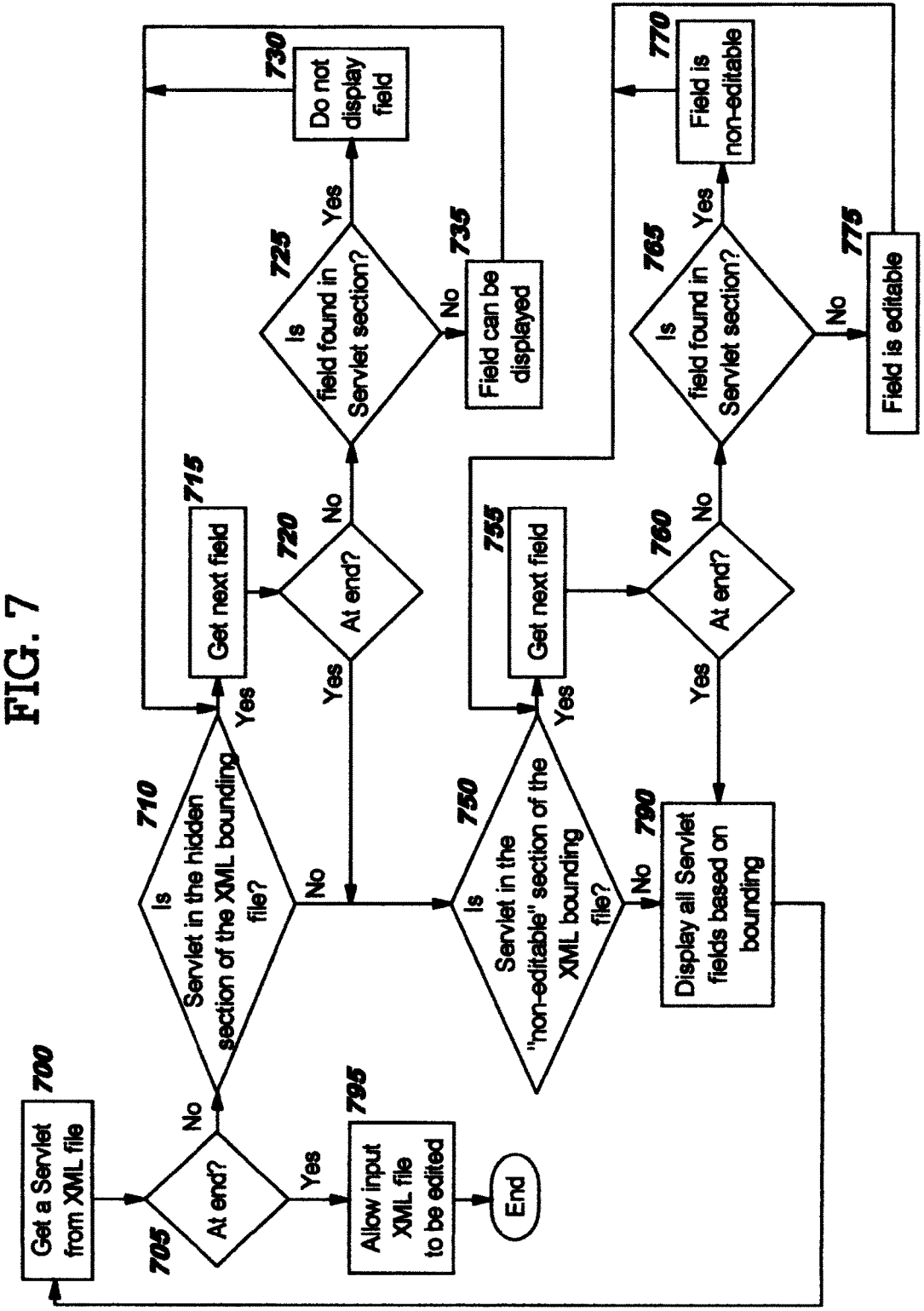
FIG. 7 provides a flow chart that sets forth logic which may be used to implement preferred embodiments of the present invention.

The manner in which the processing component enforces the restrictions in the XML bounding file will now be described with reference to FIG. 7. The logic depicted therein may be used to process an XML file to be bounded, by analyzing each of the <servlet> elements in that XML file in view of the restrictions specified by the XML bounding file. (Note that if the bounding DTD in a particular implementation allows additional or different tag names, then it will be obvious to one of ordinary skill in the art how the logic in FIG. 7 may be adapted for processing these additional or different names.)

Block 700 therefore obtains the next <servlet> element from the input XML file (i.e., the file to be bounded, which is also the file to be edited). Block 705 checks to see if the input file is at the end. If so, then the user is allowed to edit the input XML file (using a suitable GUI or other interface), as shown at Block 795, according to the restrictions that have been programmatically determined while iterating through the logic of FIG. 7. If there are still more <servlet> elements to analyze in the input XML file, then processing continues at Block 710. Blocks 710-790 compare the current <servlet> element to the restrictions (which, in the example, are specified at 620, 630, 650) of the XML bounding file, and thereby determine whether fields of this current element should be editable or hidden.

Block 710 checks to see if this <servlet> element matches an entry in the "hidden" section of the XML bounding file. In preferred embodiments, this comprises comparing the value of the current servlet tag's ID attribute to the value specified in the <servlet> tags within the <hidden> element 640. If not, then control transfers to Block 750 to begin evaluating the current <servlet> tag with reference to the "non-editable" section of the XML bounding file. Otherwise, when the current servlet is specified in the hidden section, then Block 715 gets the next field (i.e., the next tag, specifying a particular field that may need to be hidden; see Block 725) from the servlet's element within the input XML file. Block 720 checks to see if the list of fields is at the end. If so, then control transfers to Block 750, and if not, processing continues at Block 725, where a test is made to see if this current field from the input XML file is specified in the servlet's tag within the XML bounding file (indicating that the field is to be hidden).

With reference to the examples, suppose <servlet> element 410 from FIG. 4 is being analyzed. The ID attribute value of this servlet element does not match any of the attribute values within <hidden> element 640, and thus the test at Block 710 has a negative result when processing this servlet element, transferring control directly to Block 750.

If this field is to be hidden (i.e., the test in Block 725 has a positive result), then at Block 730, provision is made for not displaying this field to the user for editing. (This may be accomplished in a number of ways, such as setting a binary flag that the processing component associates with this tag from the input XML file; storing information in a data structure, such as a composite list of editable fields; etc. Hereinafter, such provisions are referred to as "marking" the field.) Control then returns to Block 715 to get the next field from the input XML, file.

When the test in Block 725 has a negative result, then this field can be displayed to the user, and thus Block 735 marks the field to this effect before returning control to Block 715.

Block 750 is reached when the current <servlet> tag from the input XML file has been fully analyzed with reference to the <hidden> element of the XML bounding file, and begins the analysis of this current tag with reference to the <non-editable> element. Block 750 therefore checks to see if this current <servlet> element matches an entry in the "non-editable" section of the XML bounding file. In preferred embodiments, this comprises comparing the value of the current servlet tag's ID attribute to the value specified in the <servlet> tags within the <non-editable> element 610. (Note that the logic in FIG. 7 allows a particular servlet from the input XML file to have some fields that are hidden and some fields that are non-editable.) If this servlet is not identified in the non-editable section (i.e, the test in Block 750 has a negative result), then analysis of this current servlet element is complete and control transfers to Block 790.

Referring again to the examples, because the ID attribute of <servlet> element 410 matches one of the attribute values within <non-editable> element 610 (in particular, the value in element 630), the test at Block 750 has a positive result when processing this servlet element, and the fields of <servlet> element 410 will therefore be analyzed by transferring control to Block 755.

Otherwise, when the current servlet is specified in the non-editable section (i.e, the test in Block 750 has a positive result), then Block 755 gets the next field (which in this case specifies a particular field to be checked as being non-editable; see Block 765) from the servlet's element within the input XML file. Block 760 checks to see if the list of fields is at the end. (Note that the list of servlet fields is processed anew in the logic of Blocks 750-775, and thus each field processed in Blocks 710-735 may be processed again, using the logic of FIG. 7.) If so, then control transfers to Block 790, and if not, processing continues at Block 765, where a test is made to see if this current field from the input XML file is specified in the servlet's tag within the XML bounding file (indicating that the field is non-editable).

If this field cannot be edited (i.e., the test in Block 765 has a positive result), then at Block 770, this field of the current servlet is marked as non-editable by the processing component. Control then returns to Block 755 to get the next field from the input XML file.

When the test in Block 765 has a negative result, then this field can be edited by the user, and thus Block 775 marks the field to this effect before returning control to Block 755.

With reference to the examples, the first field from the input XML file for <servlet> element 410 is <servlet-name> 412. Block 765 will determine that this field is present in the XML bounding file for this servlet, and Block 770 will therefore mark the field accordingly. Block 755 will then get the <display-name> tag 413, and because this tag is not listed in the XML, bounding file entry at 630, the processing of Block 775 will be reached, where this field will be marked as editable.

Upon reaching Block 790, analysis of this current servlet element from the input XML file, regarding whether the fields of this servlet element are hidden and/or non-editable, is complete. Control then returns to Block 700, where the next <servlet> element from the input XML file will be retrieved for processing. (Referring to the example input XML file 400, <servlet> tag 420 will be processed by the next iteration through the logic of FIG. 7.)

Once control reaches Block 795, the XML bounding file has been applied to the entire contents of the input XML file, determining how the user should be allowed to edit the that file. Block 795 therefore allows the editing to proceed, as stated earlier, using a suitable GUI or other interface. This GUI uses the markings created by iterating through FIG. 7, and displays only those fields which are not marked as hidden, and allows editing only of those fields which are not marked as non-editable.

In alternative embodiments, the bounding DTD may provide additional or different types of controls on the user's editing capabilities. That is, while the bounding DTD in FIG. 5 allows the developer to restrict, on a per-tag level, whether tags in identified servlets can be hidden or edited, it may be desirable to offer developers other approaches. Thus, the language defined by the bounding DTD in FIG. 5 is provided by way of illustration, but not of limitation. Once the techniques disclosed herein are known, those of skill in the art may use these techniques for defining other bounding languages and for creating processing components that enforce the features of these other bounding languages. FIG. 8 shows one such alternative bounding DTD 800, which may be used in alternative embodiments when specifying XML bounding files to control the editing of input XML files. This bounding DTD 800 will be described with reference to how it differs from bounding DTD 500. FIG. 9 illustrates a sample XML bounding file 900 created according to bounding DTD 800, and will be used to describe elements thereof.

As shown at 810, this bounding DTD 800 includes more types of restrictions than simply hiding tags and specifying tags as being non-editable. Additional choices include a "global" element and an "action-required" element. These elements are shown in one preferred expanded form at 820 and 850, respectively. Furthermore, the "non-editable" and "hidden" choices have been defined differently, in contrast to bounding DTD 500, and a preferred expansion of these elements is provided at 830 and 840, respectively.

The global element 820 may be used as a Boolean flag, where the appearance of one of its child elements in an XML bounding file provides a signal to the processing component for restrictions that are to be applied to an input XML file in a global manner, without regard to individual tags or elements. Thus in FIG. 9, the <global> element 910 includes two tags that function in this manner. As explained in the comments within bounding DTD 800, the first of these tags signals the processing component that the user is not allowed to add any new servlets to the input XML file, and the second of these tags signals the processing component that no new initialization parameters (i.e., "<init-param>" tags) are to be added. Note that the definition of this second tag, "<disable-add-new-init-param>", provided in bounding DTD 800 allows for a child element that names a particular servlet. Thus, the developer may allow for new <init-param> tags to be added for some servlets, but not for others.

In this bounding DTD 800, the highest-level definition of "<non-editable>" is different from that in bounding DTD 500. Here, provisions are made for specifying tags in the XML bounding file that will signal the processing component to make selected fields of all servlets non-editable (using "<non-editable-all-servlet>", then naming the selected fields as shown at 920 of FIG. 9); to make selected fields of identified servlets non-editable (using "<non-editable-servlet>", then providing a <servlet-name> element along with the selected fields as shown at 930 of FIG. 9); to make selected initialization parameters of all servlets non-editable (using "<non-editable-all-init-param>", then naming the selected fields as shown at 940 of FIG. 9); and to make selected initialization parameters of identified servlets non-editable (using "<non-editable-init-param>", then providing a <param-name-field> element along with the selected initialization parameters; this has not been illustrated in FIG. 9). Note that these four choices can be applied to all servlets, all fields of an identified servlet, all initialization parameters, or all initialization parameters of an identified servlet, respectively, by omitting a child element in the XML bounding file. Thus, if the <param-name-field> tag was omitted in element 940, the processing component preferably interprets this is a signal to prevent editing of all initialization parameters (i.e., of all <init-param> elements).

The "<non-editable-servlet>" element definition at 830 includes additional fields, as compared to the "<servlet>" element within the <non-editable> element of the bounding DTD 500 in FIG. 5, including a <servlet-name> element with which servlets are to be identified according to this particular bounding language and a <servlet-mapping-field> element (which may be processed similarly to other elements).

The "<hidden>" element definition at 840 allows hiding servlets by name, using syntax such as that shown at 950, as well as hiding identified <init-param> elements. In the latter case, an identified <init-param> element can be hidden for all servlets by omitting specification of a <servlet-name> child element in the XML, bounding DTD, as shown in FIG. 9 at 960. (In other words, this syntax at 960 specifies that no occurrences of the <param-name> element having a value of "ZNV_INSTALLATION" are editable within any <init-param> elements.)

Bounding DTD 800 provides the developer a way to specify that certain actions are required from the editing user, using an <action-required> element defined at 850. This required action may pertain to a named servlet, as shown at 970 in FIG. 9, or to a named initialization parameter, as shown at 980. As can be seen by inspecting the definitions at 850, the developer may specify that action is required, in the servlet case, on the <servlet-name-field> tag, <display-name-field> tag, etc.; in the initialization parameter case, he may specify that action is required on the <servlet-name> tag, <param-name-field> tag, etc.

Based on the teachings disclosed herein (and with reference to the example in FIG. 7), logic for handling these additional and different choices may be provided to create a processing component that enforce the features of this bounding language, in order that an XML bounding file such as file 900 in FIG. 9 can be used to programmatically restrict editing of input XML files.

As has been demonstrated, the present invention provides a number of advantages, including allowing users to have a way to edit an XML file without necessarily having any XML knowledge; allowing developers to provide restrictions on the user's editing capabilities by (for example) specifying selected elements that are to be hidden from the user and/or that the user is to be prevented from editing; and reducing the user's risk of error, thereby limiting the possibility of users making their environment unstable. It may be advantageous, in some implementations, to incorporate the teachings herein into the features of a toolkit.

While preferred embodiments of the present invention have been described, additional variations and modifications in those embodiments may occur to those skilled in the art once they learn of the basic inventive concepts. The techniques disclosed herein are based partially upon certain predefined characteristics of the notations being processed. It will be obvious to one of ordinary skill in the art that the inventive concepts disclosed herein may be adapted to changes in the notations, should they occur. Furthermore, while preferred embodiments are described with reference to a DTD, this is intended to encompass analogous types of structured markup language definition documents. Therefore, it is intended that the appended claims shall be construed to include both the preferred embodiments and all such variations and modifications as fall within the spirit and scope of the invention.

What is claimed is:

1. A system for controlling editing, comprising:
a computer comprising a processor; and
instructions which are executable, using the processor, to implement functions comprising:
determining allowable edits of a plurality of content elements specified in a structured content document by analyzing, using a processing component, content specified in a bounding file, wherein:
a bounding language is defined in a bounding document type definition ("DTD"), the bounding language comprising a plurality of allowable edits that are selectable for applying to the content elements specified in the structured content document;
the bounding file adheres to the bounding language defined in the bounding DTD and specifies, in the bounding language, at least one selected one of the selectable edits, and for each selected one of the selectable edits, at least one of the content elements of the structured content document to which that selected one of the selectable edits can be applied;

a content language is defined in a content DTD, the content language comprising a plurality of allowable content elements, the content language being distinct from the bounding language and the content DTD being distinct from the bounding DTD;

the structured content document adheres to the content language defined in the content DTD and specifies, in the content language, the plurality of the content elements;

the structured content document is distinct from the bounding file;

the bounding file is not a DTD or schema and does not contain definitional elements of a DTD or schema; and a particular edit of the content elements of the structured content document is allowable only if it is not precluded by the specified selectable edits in the bounding file; and processing, by the processing component, a request to edit a selected one of the content elements of the structured content document, comprising allowing the requested edit to be performed on the selected one only if the determining has determined that the requested edit is allowable and otherwise preventing the requested edit from being performed on the selected one.

2. The system according to claim 1, wherein the structured content document is encoded in Extensible Markup Language ("XML").

3. The system according to claim 1, wherein:
the bounding file specifies one or more of the content elements of the structured content document that can be edited; and
the determining determines that editing of the specified ones of the content elements is allowable and editing of non-specified ones of the content elements is not allowable.

4. The system according to claim 1, wherein:
the bounding file specifies one or more of the content elements of the structured document that are to be hidden from a presented view from which the request to edit is received, thereby preventing the request from selecting any of the specified one or more content elements.

5. The system according to claim 1, wherein:
the bounding file specifies one or more parameters of one or more of the content elements of the structured content document that can be edited; and
the determining determines that editing of the specified ones of the parameters is allowable and editing of non-specified ones of the parameters is not allowable.

6. The system according to claim 1, wherein the bounding file specifies one or more parameters of one or more of the content elements of the structured content document that are to be hidden from a presented view from which the request to edit is received, thereby preventing the request from selecting any of the specified one or more parameters.

7. A computer program product for controlling editing, the computer program product comprising:
a non-transitory computer-readable storage medium having computer-readable program code embodied therein, the computer-readable program code configured for:
determining allowable edits of a plurality of content elements specified in a structured content document by analyzing, using a processing component, content specified in a bounding file, wherein:

a bounding language is defined in a bounding document type definition ("DTD"), the bounding language comprising a plurality of allowable edits that are selectable for applying to the content elements specified in the structured content document;

the bounding file adheres to the bounding language defined in the bounding DTD and specifies, in the bounding language, at least one selected one of the selectable edits, and for each selected one of the selectable edits, at least one of the content elements of the structured content document to which that selected one of the selectable edits can be applied;

a content language is defined in a content DTD, the content language comprising a plurality of allowable content elements, the content language being distinct from the bounding language and the content DTD being distinct from the bounding DTD;

the structured content document adheres to the content language defined in the content DTD and specifies, in the content language, the plurality of the content elements;

the structured content document is distinct from the bounding file;

the bounding file is not a DTD or schema and does not contain definitional elements of a DTD or schema; and a particular edit of the content elements of the structured content document is allowable only if it is not precluded by the specified selectable edits in the bounding file; and processing, by the processing component, a request to edit a selected one of the content elements of the structured content document, comprising allowing the requested edit to be performed on the selected one only if the determining has determined that the requested edit is allowable and otherwise preventing the requested edit from being performed on the selected one.

8. The computer program product according to claim 7, wherein the structured content document is encoded in Extensible Markup Language ("XML").

9. The computer program product according to claim 7, wherein:
the bounding file specifies one or more of the content elements of the structured content document that can be edited; and
the determining determines that editing of the specified ones of the content elements is allowable and editing of non-specified ones of the content elements is not allowable.

10. The computer program product according to claim 7, wherein:
the bounding file specifies one or more of the content elements of the structured document that are to be hidden from a presented view from which the request to edit is received, thereby preventing the request from selecting any of the specified one or more content elements.

11. The computer program product according to claim 7, wherein:
the bounding file specifies one or more parameters of one or more of the content elements of the structured content document that can be edited; and the determining determines that editing of the specified ones of the parameters is allowable and editing of non-specified ones of the parameters is not allowable.

12. The computer program product according to claim 7, wherein the bounding file specifies one or more parameters of one or more of the content elements of the structured content document that are to be hidden from a presented view from which the request to edit is received, thereby preventing the request from selecting any of the specified one or more parameters.

* * * * *